(12) United States Patent
Ding et al.

(10) Patent No.: US 6,396,885 B1
(45) Date of Patent: May 28, 2002

(54) CO-CHANNEL INTERFERENCE REDUCTION IN WIRELESS COMMUNICATIONS SYSTEMS

(75) Inventors: Zhi Ding, Iowa City, IA (US); Philip H. Thomas, Carp (CA); Rui Wang; Wen Tong, both of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/203,755

(22) Filed: Dec. 2, 1998

(51) Int. Cl.$^7$ ................................................ H04L 1/02
(52) U.S. Cl. ...................... 375/347; 375/263; 375/346; 370/252; 370/342
(58) Field of Search ................................. 375/347, 346, 375/267; 455/132, 296; 370/342, 252

(56) References Cited

U.S. PATENT DOCUMENTS

| | | | | |
|---|---|---|---|---|
| 5,680,419 A | * | 10/1997 | Bottomley | 375/347 |
| 5,991,273 A | * | 11/1999 | Abu-Dayya | 370/252 |
| 6,097,773 A | * | 8/2000 | Carter et al. | 375/347 |
| 6,167,039 A | * | 12/2000 | Karlsson et al. | 370/342 |

OTHER PUBLICATIONS

Gardner, W., "Exploitation of Spectral Redundancy in Cyclostationary Signals," IEEE SP Magazine, pp. 14–36, (Apr. 1991).

Winters, J., "Signal Acquisition and Tracking with Adaptive Arrays in the Digital Mobile Radio System IS–54 with Flat Fading," IEEE Transactions on Vehicular Technology, vol. 42, No. 4, pp. 377–384, (Nov. 1993).

Cupo, R., et al., "A Four–Element Adaptive Antenna Array for IS–136 PCS Base Stations," AT&T Labs–Research, Lucent Technologies—Bell Labs.

* cited by examiner

*Primary Examiner*—Stephen Chin
*Assistant Examiner*—Shuwang Liu
(74) *Attorney, Agent, or Firm*—Foley & Lardner

(57) ABSTRACT

Co-channel interference with a desired signal in a receiver arrangement of a TDMA cellular radio communications system having two antennas and receivers for providing two received signals is reduced. Two sampled signals are derived from each of the two received signals by sampling the respective received signal at twice the symbol rate of the system and separating alternate samples at twice the symbol rate to produce the two sampled signals each with different samples at the symbol rate, providing a total of four sampled signals from the two antennas. These signals are linearly combined with respective weights to produce an output signal, the weights being determined to reduce co-channel interference with the desired signal represented by the output signal.

13 Claims, 1 Drawing Sheet

CO-CHANNEL INTERFERENCE REDUCTION IN WIRELESS COMMUNICATIONS SYSTEMS

This invention relates to co-channel interference reduction in wireless communications systems, for example cellular radio systems using TDMA (time division multiple access) techniques, such as so-called IS-54, IS-136, and GSM systems.

BACKGROUND OF THE INVENTION

An important factor that limits the performance of cellular radio communications systems is the existence of co-channel interference, typically from reuse of the same frequency bands and time slots in different cells of the system. The significance of co-channel interference increases with increasing requirements for communications capacity of the system.

It is well known that co-channel interference limitations can be reduced by the use of multiple antennas or antenna arrays. However, this has significant disadvantages in that it also requires the use of multiple RF (radio frequency) front ends or receiver stages, one for each antenna, resulting in excessive costs. In practice, for the reverse link or upstream direction of transmission from a typically mobile end station to a base station of a TDMA cellular radio communications system, in practice it is desirable for the base station receiver to use only two antennas.

It is also known to use DMI (direct matrix inversion) techniques to process base station received signal samples to determine a linear combination or weighting that is intended to minimize the MSE (mean square error) between the combined output and the transmitted signal, this determination being achieved by a Wiener weight solution during each TDMA time slot when the transmitted signal data sequence is known, e.g. during the transmission of known synchronization (e.g. SYNC) and/or colour code (e.g. CDVCC) signals. With only two antennas, only two weights are required, and a 2×2 matrix inverse for the Wiener solution is relatively simple to implement.

Using DMI techniques, the optimum weights which are determined and fixed at one part of the time slot can become quite inappropriate at other parts of the time slot, so that such techniques tend to be inadequate under fast and frequency-selective fading conditions, as typically occur with mobile cellular radio communications systems.

Furthermore, the use of only two antennas, providing only two received signal sample sequences, only allows for the nulling or rejection from the desired signal of a single co-channel interference signal. Typically in a cellular radio communications systems there may be two or three simultaneous independent co-channel interference signals, which may be of similar signal strengths. When multiple interference signals are present, with a known system using only two antennas only the strongest interference signal is rejected from the desired signal, and the presence of the other interference signals can result in high error rates in the desired signal.

An object of this invention is to provide an improved method of and apparatus for reducing co-channel interference.

SUMMARY OF THE INVENTION

One aspect of this invention provides a method of reducing co-channel interference in a receiver arrangement of a communications system providing two received signals each comprising transmitted symbols having a predetermined symbol rate, comprising the steps of: for each received signal: sampling the received signal to provide a sampled received signal comprising symbols at twice the predetermined symbol rate; and deriving first and second sampled signals from the sampled received signal, each of said first and second sampled signals comprising samples at the predetermined symbol rate corresponding to respective alternate samples of the sampled received signal at twice the predetermined symbol rate; combining the first and second sampled signals derived from the two received signals with respective weights to produce an output signal; and determining the respective weights to reduce co-channel interference with a desired signal represented by said output signal.

Preferably the step, for each received signal, of deriving the first and second sampled signals comprises decimating by a factor of two samples of the sampled received signal at twice the predetermined symbol rate to produce the first sampled signal, delaying samples of the sampled received signal at twice the predetermined symbol rate by one symbol to produce a delayed sampled received signal, and decimating by a factor of two samples of the delayed sampled received signal at twice the predetermined symbol rate to produce the second sampled signal.

The step of combining the first and second sampled signals derived from the two received signals with respective weights to produce the output signal can comprise multiplying each of the first and second sampled signals by a respective weight to produce a respective product, and summing said respective products. This step can further comprise delaying each of the first and second sampled signals by at least one symbol at the predetermined symbol rate to produce at least one respective delayed signal, multiplying the respective delayed signals by respective weights to produce further products, and summing the further products with said respective products to produce the output signal.

Another aspect of this invention provides a receiver arrangement for a communications system, comprising: first and second receivers for providing two received signals each comprising transmitted symbols having a predetermined symbol rate; samplers for sampling the received signals at twice the predetermined symbol rate to produce sampled received signals; delay elements for delaying the sampled received signals each by one symbol at twice the predetermined symbol rate to produce delayed signals; decimators for decimating the sampled received signals and the delayed signals each by a decimation factor of two to produce four sampled signals each comprising samples at the predetermined symbol rate; and a combining arrangement for combining the four sampled signals with respective weights to produce an output signal.

The combining arrangement can comprise a linear filter for each of the four sampled signals. Such a linear filter can comprise at least one delay element for each of the four sampled signals for delaying the respective sampled signal by one symbol at the predetermined symbol rate, at least two multipliers for multiplying the respective sampled signal and an output of each delay element by a respective weight to produce a respective product, and a summing circuit for summing the respective products to produce the output signal.

Each of the first and second receivers can comprise an antenna and a radio frequency circuit for providing a respective one of the two received signals, and can further comprise a matched filter for filtering the respective received signal in accordance with a function g(−t), where g(t) represents a signal pulse shaping function applied to pulses of a transmitted signal of the communications system. For example, the signal pulse shaping function can have a square root raised cosine frequency response with a predetermined roll-off factor, for example about 0.35.

The invention also provides a method of reducing co-channel interference with a desired signal in a receiver arrangement of a TDMA cellular radio communications system having two antennas and receivers for providing two received signals, comprising deriving two sampled signals from each of the two received signals by sampling the respective received signal at a rate of at least twice a predetermined symbol rate of the system and separating alternate samples at twice the predetermined symbol rate to produce said two sampled signals each with different samples at the predetermined symbol rate, linearly combining the two sampled signals derived from each of the two received signals with respective weights to produce an output signal, and determining the respective weights to reduce co-channel interference with the desired signal represented by said output signal.

BRIEF DESCRIPTION OF THE DRAWINGS

The invention will be further understood from the following description with reference to the accompanying drawing, in which.

DETAILED DESCRIPTION

Figure 1:
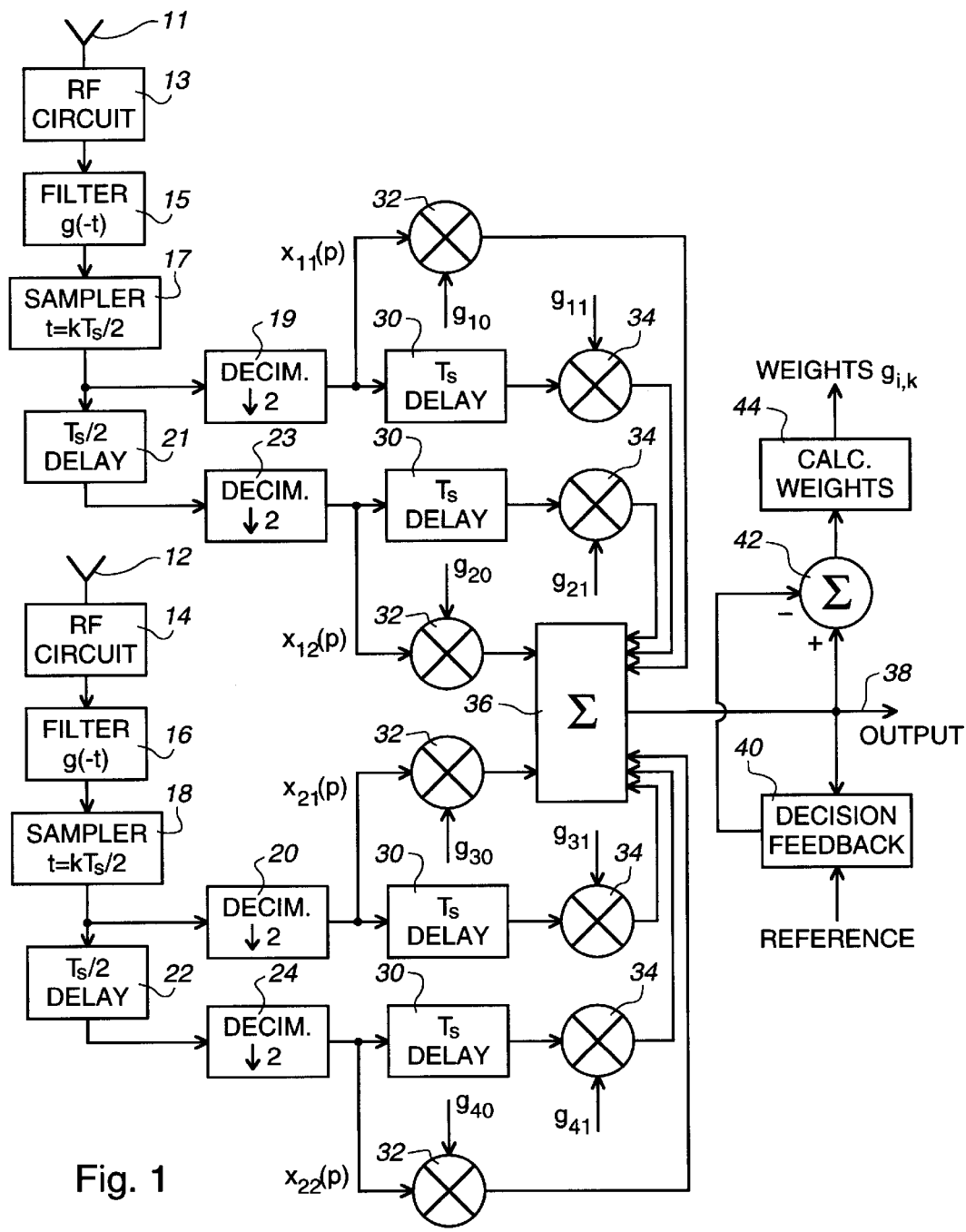
FIG. 1 schematically illustrates in a block diagram parts of a base station receiver arrangement of a TDMA cellular radio communications system in accordance with an embodiment of this invention.

Referring to FIG. 1, the receiver arrangement illustrated therein is provided for a base station of a TDMA cellular radio communications system for receiving signals in the reverse or upstream direction from fixed or mobile terminals (not shown) in respective time slots. For example, the communications system may be an IS-54, IS-136, or GSM system. The receiver arrangement includes two antennas 11, 12 each of which supplies received signals to a respective RF front end circuit 13, 14 of known form.

Denoting signals derived from the first and second antenna 11 and 12 by the suffix i=1 and i=2 respectively, then for different terminals identified by the suffix k which is an integer from 1 to a maximum number M, the received noiseless data signal $s_{i,k}(t)$ can be written as:

$$s_{i,k}(t) = \sum_n g(t - nT_s - t_k)\cos\Phi_{k,n}\cos(\omega_k + \psi_{k,i}) - \sum_n g(t - nT_s - t_k)\sin\Phi_{k,n}\sin(\omega_k + \psi_{k,i})$$

where t denotes time, $T_s$ is the symbol period, $\omega_k$ is the angular frequency and $\psi_{k,i}$ is the relative phase at the antenna i for the signal received from the terminal k, and $\Phi_{k,n}$ is the absolute phase of the signal for the terminal k for the n-th symbol interval, $\Phi_{k,n}$ being differentially encoded so that:

$$\Phi_{k,n} = \Phi_{k,n-1} + \Delta\Phi_{k,n}$$

where $\Delta\Phi_{k,n}$ is the differential phase representing two bits of the transmitted data signal. In addition, g(t) represents the transmitted signal pulse shaping function which for example has a square root raised cosine frequency response with a roll-off factor of β=0.35. This roll-off factor (which is given here only by way of example, and smaller or larger roll-off factors may be used) results in the transmission of excess information that is made use of by embodiments of the present invention.

The resulting baseband signal at the output of each RF front end circuit 13, 14 is a sum of signals for all of the M terminals. These baseband signals, and other signals derived from them as described below, are complex signals. If carrier recovery is achieved for the signals received from both antennas 11, 12 for a desired signal identified by k=1, then this resulting baseband signal $s_i(t)$ is given by:

$$s_i(t) = \sum_{k=1}^{M} c_{i,k}(t)\sum_n g(t - nT_s - t_k)\exp[j(\Phi_{k,n} + \psi_{k,i} - \psi_{1,i})] + v_i(t)$$

where $c_{i,k}(t)$ is the flat fading channel gain (assumed to be independent Rayleigh) for the terminal k and the antenna i, and $v_i(t)$ is additive Gaussian noise. It is desired to recover successfully the desired terminal signal $\Phi_{1,n}$.

The output of each RF front end circuit 13, 14 is supplied to a matched filter 15, 16 respectively having a response g(−t). In order to make use of the excess information due to the roll-off factor β as indicated above, the signals produced at the outputs of the matched filters 15, 16, denoted by $x_i(t)=s_i(t)\cdot g(-t)$, are sampled at twice the symbol rate $1/T_s$, i.e. with a sampling interval of $T_s/2$, by samplers 17, 18 respectively. As a result, the sampled output signals of the samplers 17, 18 are given by:

$$x_i\left(p\frac{T_s}{2}\right) = \sum_{k=1}^{M} c_{i,k}\left(p\frac{T_s}{2}\right)\sum_n h\left(p\frac{T_s}{2} - nT_s - t_k\right)\exp[j(\Phi_{k,n} + \psi_{k,i} - \psi_{1,i})] + \gamma_i\left(p\frac{T_s}{2}\right)$$

where p is an integer denoting each sample, $h(t)=g(t)\cdot g(-t)$ is the raised cosine pulse, and the noise component $\gamma_i(t)=v_i(t)\cdot g(-t)$ remains white Gaussian due to the frequency response of the matched filter 15 or 16.

As the output of each sampler 17, 18 is a cyclostationary sequence, it can be divided into two independent stationary sequences each with a sampling interval of $T_s$ corresponding to the symbol rate $1/T_s$. In the arrangement of FIG. 1, this is achieved for signals derived from the first antenna 11 by a decimator 19, having a decimation factor of 2 so that it passes only alternate samples to its output, having its input coupled to the output of the sampler 17; a delay element 21 providing a delay of $T_s/2$ having its input coupled to the output of the sampler 17; and a decimator 23, also having a decimation factor of 2, having its input coupled to the output of the delay element 21. A similar arrangement of a decimator 20, a $T_s/2$ delay element 22, and a decimator 24 is provided for signals derived from the second antenna 12. Consequently, four independent stationary sample sequences $x_{11}$, $x_{12}$, $x_{21}$, and $x_{22}$ are produced at the outputs of the decimators 19, 23, 20, and 24 respectively, these sequences being given by:

$$x_{11}(p) = x_1[2pT_s/2] = x_1(pT_s)$$
$$x_{12}(p) = x_1[(2p+1)T_s/2] = x_1(pT_s + T_s/2)$$
$$x_{21}(p) = x_2[2pT_s/2] = x_2(pT_s)$$
$$x_{22}(p) = x_2[(2p+1)T_s/2] = x_2(pT_s + T_s/2)$$

It can be seen, therefore, that instead of doubling the number of antennas and RF circuits that would be required to produce four independent signals, the receiver arrangement of FIG. 1 doubles the sampling rate and separates and decimates the resulting signals to produce four signals which are independent of one another due to the excess information which is contained in the received signals as a result of the roll-off factor and hence excess bandwidth used for the signal transmission.

The above four signal sequences $x_{i,j}$, where i=1 or 2 for signals derived from the first and second antennas and j=1 or 2 corresponding to the two signal sequences derived from each antenna, produced at the outputs of the decimators can be represented by:

$$x_{ij}[n] = \sum_{k=1}^{M} H_{ij,k}(z)a_k[n] + \gamma_{ij}[n]$$

where $a_k[n]=\exp[j(\Phi_{k,n})]$, $\gamma_{ij}[n]$ are white Gaussian noise components, and $H_{ij,k}(z)$ are dynamic system responses given by:

$$H_{11,k}(z) \equiv c_{1,k}(pT_s)e^{j(\psi_{k,1}-\psi_{1,1})}\sum_{n} h(nT_s - t_k)z^{-n}$$

$$H_{12,k}(z) \equiv c_{1,k}(pT_s + T_s/2)e^{j(\psi_{k,2}-\psi_{1,2})}\sum_{n} h(nT_s - t_k + T_s/2)z^{-n}$$

$$H_{21,k}(z) \equiv c_{2,k}(pT_s)e^{j(\psi_{k,1}-\psi_{1,1})}\sum_{n} h(nT_s - t_k)z^{-n}$$

$$H_{22,k}(z) \equiv c_{21,k}(pT_s + T_s/2)e^{j(\psi_{k,2}-\psi_{1,2})}\sum_{n} h(nT_s - t_k + T_s/2)z^{-n}$$

The overall system can be viewed as a multiple-input multiple-output (MIMO) system with M inputs and four outputs. Defining signal vectors:

$$x[n] = \begin{bmatrix} x_{11}[n] \\ x_{12}[n] \\ x_{21}[n] \\ x_{22}[n] \end{bmatrix}$$

$$r[n] = \begin{bmatrix} \gamma_{11}[n] \\ \gamma_{12}[n] \\ \gamma_{21}[n] \\ \gamma_{22}[n] \end{bmatrix}$$

$$a[n] = \begin{bmatrix} a_1[n] \\ a_2[n] \\ \vdots \\ a_M[n] \end{bmatrix}$$

the MIMO system transfer function matrix can be defined as:

$$H(z) = \begin{bmatrix} H_{11,1}(z) & H_{11,2}(z) & \cdots & H_{11,M}(z) \\ H_{12,1}(z) & H_{12,2}(z) & \cdots & H_{12,M}(z) \\ H_{21,1}(z) & H_{21,2}(z) & \cdots & H_{21,M}(z) \\ H_{22,1}(z) & H_{22,2}(z) & \cdots & H_{22,M}(z) \end{bmatrix}$$

with a consequently simple input-output relationship given by:

$$x[n]=H(z)a[n]+r[n]$$

To recover the desired signal sequence $a_1[n]$ from the received signals x[n] a vector filter is designed with four linear filters. With:

$$G(z)=[G_1(z) G_2(z) G_3(z) G_4(z)]$$

in which:

$$G_i(z) \equiv \sum_{k=0}^{L-1} g_{i,k} z^{-k}$$

where i is an integer from 1 to 4, k is an integer from 0 to L-1, and L is the number of delay taps of the temporal FIR filter which can be one or more, optimum parameters $g_{i,k}$ for the vector filter can be determined by denoting:

$$g=[g_{1,0} \cdots g_{1,L-1} g_{2,0} \cdots g_{2,L-1} g_{3,0} \cdots g_{3,L-1} g_{4,0} \cdots g_{4,L-1}]^T$$

where the superscript T denotes transpose, and:

$$X[n]=[x_{11}[n] \ldots x_{11}[L-1] x_{12}[n] \ldots x_{12}[L-1] x_{21}[n] \ldots x_{21}[L-1] \\ x_{22}[n] \ldots x_{22}[L-1]]^T$$

to give a new array system output given by:

$$y[n]=G(z)x[n]=g^T X(n).$$

FIG. 1 illustrates the resulting array system for the case of L=2, for which each of the four linear filters comprises a delay element 30 having an input coupled to the output of a respective one of the decimators 19, 20, 23, and 24, and two multipliers 32 and 34 which multiply the input and output of the respective delay element 30 by respective weights $g_{i,k}$, where as indicated above i is an integer from 1 to 4 denoting the respective linear filter and k is 0 or L−1=1. The outputs of all of the multipliers 32 and 34 are summed by a summing circuit 36 to produce the output signal y[n] on a line 38.

As also illustrated in FIG. 1, during known or training symbol sequences, such as the SYNC and/or SACCH/CDVCC sequences in each time slot of an IS-54 system, the output signal on the line 38 is compared in a decision feedback circuit 40 with a reference signal, such as locally provided SYNC and/or SACCH/CDVCC sequences, and a resulting error signal is subtracted from the output signal by a summing circuit 42 the output of which is supplied to a weight calculating circuit 44 which generates and updates the weights $g_{i,k}$ for the linear filters in a generally known manner, in accordance with:

$$g=(E\{X^*[n]X^T[n]\})^{-1}E\{X^*[n]a_1[n-d]\}$$

where $a_1[n]$ is the known desired input signal and d is the filter delay. The optimum filter parameter vector g can be updated using techniques such as least mean square, especially for large values of L, or block least square approximation, especially for smaller values of L and for fast tracking for mobile terminals.

It can be appreciated that, because the receiver arrangement described above provides four independent signals using the excess bandwidth information contained in the transmitted signals, it enables a co-channel interference from up to three interfering sources to be substantially reduced from a desired signal. Furthermore, this is achieved without an increase in the number of antennas and RF front end circuits required by the receiver arrangement.

Although a particular embodiment of the invention has been described in detail, it can be appreciated that numerous modifications, variations, and adaptations may be made thereto without departing from the scope of the invention as defined in the claims.

What is claimed is:

1. A method of reducing co-channel interference in a receiver arrangement of a communications system providing two received signals each comprising transmitted symbols having a predetermined symbol rate, comprising the steps of:
   for each received signal:
      sampling the received signal to provide a sampled received signal comprising symbols at twice the predetermined symbol rate; and
      deriving first and second sampled signals from the sampled received signal, each of said first and second sampled signals comprising samples at the predetermined symbol rate corresponding to respective alternate samples of the sampled received signal at twice the predetermined symbol rate;
   combining the first and second sampled signals derived from the two received signals with respective weights to produce an output signal; and
   determining the respective weights to reduce co-channel interference with a desired signal represented by said output signal.

2. A method as claimed in claim 1 wherein the step, for each received signal, of deriving the first and second sampled signals comprises decimating by a factor of two samples of the sampled received signal at twice the predetermined symbol rate to produce the first sampled signal, delaying samples of the sampled received signal at twice the predetermined symbol rate by one symbol to produce a delayed sampled received signal, and decimating by a factor of two samples of the delayed sampled received signal at twice the predetermined symbol rate to produce the second sampled signal.

3. A method as claimed in claim 1 wherein the step of combining the first and second sampled signals derived from the two received signals with respective weights to produce the output signal comprises multiplying each of the first and second sampled signals by a respective weight to produce a respective product, and summing said respective products.

4. A method as claimed in claim 3 wherein the step of combining the first and second sampled signals derived from the two received signals with respective weights to produce the output signal further comprises delaying each of the first and second sampled signals by at least one symbol at the predetermined symbol rate to produce at least one respective delayed signal, multiplying the respective delayed signals by respective weights to produce further products, and summing the further products with said respective products to produce the output signal.

5. A method as claimed in claim 1 wherein the communications system comprises a TDMA cellular radio system and the receiver arrangement comprises two antennas each providing a respective one of the two received signals.

6. A receiver arrangement for a communications system, comprising:
   first and second receivers for providing two received signals each comprising transmitted symbols having a predetermined symbol rate;
   samplers for sampling the received signals at twice the predetermined symbol rate to produce sampled received signals;
   delay elements for delaying the sampled received signals each by one symbol at twice the predetermined symbol rate to produce delayed signals;
   decimators for decimating the sampled received signals and the delayed signals each by a decimation factor of two to produce four sampled signals each comprising samples at the predetermined symbol rate; and
   a combining arrangement for combining the four sampled signals with respective weights to produce an output signal.

7. A receiver arrangement as claimed in claim 6 wherein the combining arrangement comprises a linear filter for each of the four sampled signals.

8. A receiver arrangement was claimed in claim 7 wherein the linear filter comprises at least one delay element for each of the four sampled signals for delaying the respective sampled signal by one symbol at the predetermined symbol rate, at least two multipliers for multiplying the respective sampled signal and an output of each delay element by a respective weight to produce a respective product, and a summing circuit for summing the respective products to produce the output signal.

9. A receiver arrangement as claimed in claim 6 wherein each of the first and second receivers comprises an antenna and a radio frequency circuit for providing a respective one of the two received signals.

10. A receiver arrangement as claimed in claim 9 wherein each of the first and second receivers further comprises a matched filter for filtering the respective received signal in accordance with a function $g(-t)$, where $g(t)$ represents a signal pulse shaping function applied to pulses of a transmitted signal of the communications system.

11. A receiver arrangement as claimed in claim 10 wherein the signal pulse shaping function has a square root raised cosine frequency response with a predetermined roll-off factor.

12. A receiver arrangement as claimed in claim 11 wherein the roll-off factor is about 0.35.

13. A method of reducing co-channel interference with a desired signal in a receiver arrangement of a TDMA cellular radio communications system having two antennas and receivers for providing two received signals, comprising deriving two sampled signals from each of the two received signals by sampling the respective received signal at a rate of at least twice a predetermined symbol rate of the system and separating alternate samples at twice the predetermined symbol rate to produce said two sampled signals each with different samples at the predetermined symbol rate, linearly combining the two sampled signals derived from each of the two received signals with respective weights to produce an output signal, and determining the respective weights to reduce co-channel interference with the desired signal represented by said output signal.

* * * * *